United States Patent
Zhang et al.

(10) Patent No.: US 10,904,778 B1
(45) Date of Patent: Jan. 26, 2021

(54) DETECTION AND DEDUCTION OF URGENT MESSAGES IN LOW POWER AND LOSSY NETWORKS

(71) Applicant: Cisco Technology, Inc., San Jose, CA (US)

(72) Inventors: Lele Zhang, Shanghai (CN); Akram Ismail Sheriff, San Jose, CA (US); Chuanwei Li, Shanghai (CN); Wenjia Wu, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/808,887

(22) Filed: Mar. 4, 2020

(51) Int. Cl.
| H04M 11/04 | (2006.01) |
| H04W 24/04 | (2009.01) |
| H04W 4/12 | (2009.01) |
| H04W 40/22 | (2009.01) |
| G06F 1/30 | (2006.01) |
| G06N 20/00 | (2019.01) |
| H04W 8/00 | (2009.01) |
| H04W 40/24 | (2009.01) |
| H04W 84/18 | (2009.01) |
| G06Q 50/06 | (2012.01) |

(52) U.S. Cl.
CPC .............. H04W 24/04 (2013.01); G06F 1/30 (2013.01); G06N 20/00 (2019.01); G06Q 50/06 (2013.01); H04W 4/12 (2013.01); H04W 8/005 (2013.01); H04W 40/22 (2013.01); H04W 40/246 (2013.01); H04W 84/18 (2013.01)

(58) Field of Classification Search
CPC ....... H04W 24/04; H04W 4/12; H04W 8/005; H04W 40/22; H04W 40/246; H04W 84/18; G06N 20/00; G06F 1/30; G06Q 50/06
USPC .......................................... 455/404.1, 418, 9
See application file for complete search history.

(56) References Cited

U.S. PATENT DOCUMENTS

| 9,432,248 | B2 | 8/2016 | Vasseur et al. |
| 9,785,509 | B2 * | 10/2017 | Hui ..................... G06F 11/1415 |
| 9,897,665 | B2 | 2/2018 | Taft |
| 10,425,146 | B2 * | 9/2019 | Kahtava ................ H04W 40/12 |
| 2012/0109931 | A1 * | 5/2012 | Prasad ................ G06F 11/3672 |
| | | | 707/709 |
| 2014/0105015 | A1 * | 4/2014 | Hui ........................ H04L 47/22 |
| | | | 370/230.1 |

(Continued)

*Primary Examiner* — Danh C Le
(74) *Attorney, Agent, or Firm* — Lee & Hayes, P.C.

(57) ABSTRACT

Techniques and mechanisms for detecting and deducing of urgent messages in low-power and lossy networks (LLNs) using a correlation analysis of the nodes within a network and machine learning (ML) models. Utilizing these techniques, a field network director (FND) of the network can determine neighboring devices within the network. ML models may be utilized to determine that based upon receipt of a power outage notification (PON) message and/or a power restoration notification (PRN) message from nodes, neighboring nodes of the nodes may also have suffered a power outage and/or a subsequent power restoration, even if the FND did not receive a corresponding PON message and/or a corresponding PRN message from the neighboring nodes of the network. Thus, loss of power and subsequent power restoration may be handled for large numbers of neighboring nodes within the network, even when only a few PON messages and/or subsequent PRN messages are received.

20 Claims, 6 Drawing Sheets

(56) References Cited

U.S. PATENT DOCUMENTS

| | | | |
|---|---|---|---|
| 2015/0029927 A1* | 1/2015 | Janneteau | H04L 45/02 370/312 |
| 2015/0304118 A1* | 10/2015 | Janneteau | H04L 12/189 370/312 |
| 2016/0364648 A1 | 12/2016 | Du et al. | |
| 2016/0366051 A1* | 12/2016 | Chen | H04L 45/50 |
| 2017/0034285 A1* | 2/2017 | Bhandari | H04L 67/16 |
| 2017/0048775 A1* | 2/2017 | Kim | H04W 76/18 |
| 2017/0142492 A1* | 5/2017 | Shen | H04L 65/4076 |
| 2017/0330132 A1 | 11/2017 | Kalagnanam et al. | |
| 2017/0359731 A1* | 12/2017 | Soldati | H04W 28/16 |
| 2018/0076882 A1* | 3/2018 | Prakash | H04L 41/0672 |
| 2019/0082353 A1* | 3/2019 | Nguyen | H04L 67/1044 |
| 2019/0228362 A1 | 7/2019 | Anagnostou et al. | |

\* cited by examiner

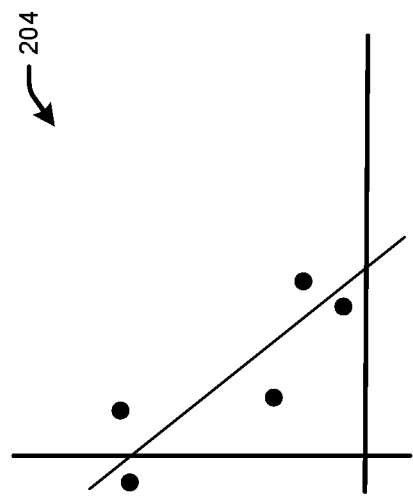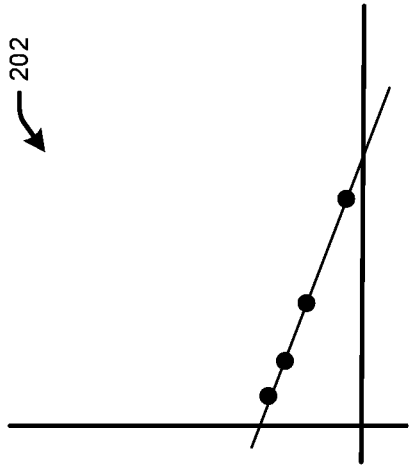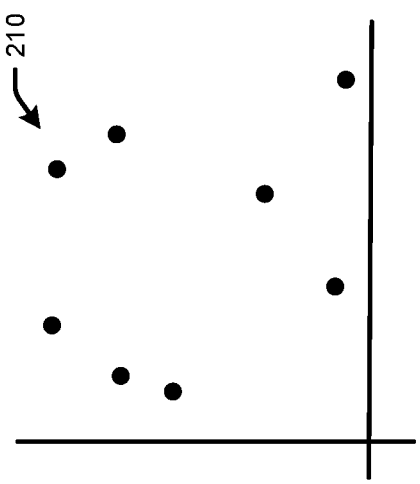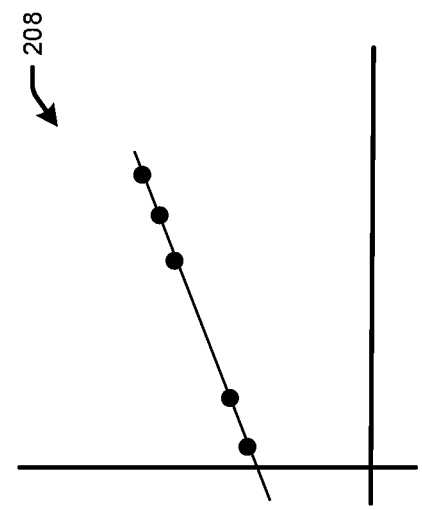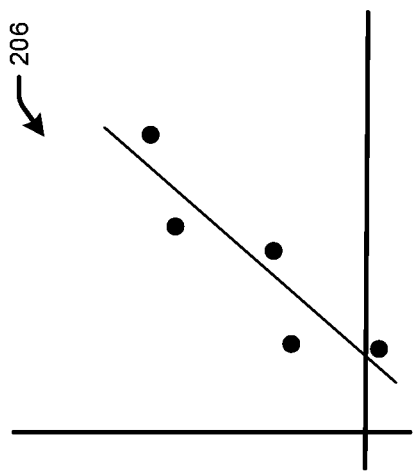
FIG. 2

400

```
┌─────────────────────────────────────────────────────────────────────────┐
│ RECEIVE AN INDICATION OF RECEIPT OF ONE OR MORE FIRST URGENT MESSAGES  │
│ AT A ROUTER FROM ONE OR MORE FIRST NODES OF THE PLURALITY OF NODES,    │
│ THE ONE OR MORE FIRST URGENT MESSAGES INDICATING A FIRST STATE OF THE  │
│ ONE OR MORE FIRST NODES                                                 │
│                                   402                                   │
└─────────────────────────────────────────────────────────────────────────┘
                                    │
                                    ▼
┌─────────────────────────────────────────────────────────────────────────┐
│ DETERMINE, USING A MODEL, ONE OR MORE SECOND NODES OF THE PLURALITY OF │
│ NODES LIKELY TO BE IN THE FIRST STATE                                   │
│                                   404                                   │
└─────────────────────────────────────────────────────────────────────────┘
                                    │
                                    ▼
┌─────────────────────────────────────────────────────────────────────────┐
│ RECEIVE AN INDICATION OF RECEIPT OF ONE OR MORE SECOND URGENT MESSAGES │
│ AT THE ROUTER FROM ONE OR MORE OF THE ONE OR MORE FIRST NODES OF THE   │
│ PLURALITY OF NODES, THE ONE OR MORE SECOND URGENT MESSAGES INDICATING  │
│ A SECOND STATE OF THE ONE OR MORE OF THE ONE OR MORE FIRST NODES       │
│                                   406                                   │
└─────────────────────────────────────────────────────────────────────────┘
                                    │
                                    ▼
┌─────────────────────────────────────────────────────────────────────────┐
│ DETERMINE, USING THE MODEL, ONE OR MORE OF THE ONE OR MORE SECOND      │
│ NODES OF THE PLURALITY OF NODES LIKELY TO BE IN THE SECOND STATE       │
│                                   408                                   │
└─────────────────────────────────────────────────────────────────────────┘
```

FIG. 4

DETECTION AND DEDUCTION OF URGENT MESSAGES IN LOW POWER AND LOSSY NETWORKS

TECHNICAL FIELD

The present disclosure relates generally to detection and deduction of urgent messages in low-power and lossy networks (LLNs) using correlation analysis and machine learning models.

BACKGROUND

Low power and lossy networks (LLNs) may be used in a variety of applications including smart grid, smart city, intelligent home and Dillon automation, and other internet-of-things (IoT) utilizations. For example, a comprehensive implementation of LLNs includes connected grid mesh (CG-mesh) networks that promote interoperable wireless standards-based solutions for Internet of Things (IoTs), such as smart grid advanced metering infrastructure (AMI) networks. Generally, an important customer requirement of such networks is to report urgent messages, such as, for example, power outage notification (PON) messages and power restoration notification (PRN) messages. Timely delivery of PON and PRN messages allows a utility to efficiently identify the occurrence of power outages and restorations, and quickly react to the events. This is essential for optimizing the utility operations such as reporting the power outage duration for future analysis, providing real-time feedback of the field work, and preventing unnecessary repair truck deployments that may be triggered by receipt of the PON messages.

In particular, customers generally request network reformation and operation after power restoration to occur with minimal delay. For example, the requirement from one customer may be 90% of PRN messages delivered within 15 minutes for an 8-hop network of around 1,000 devices. This poses big challenges for CG-mesh networks. A typical smart grid AMI network contains one field area router (FAR) and thousands of devices arranged in a hop configuration. Thus, a device may have hundreds of neighboring devices. The normal network formation process (network discovery, authentication, network configuration, and routing configuration) is generally too slow to meet customer requirements upon power restoration. Furthermore, due to the characteristics of LLNs, there are lots of interference and collisions when hundreds of devices power on simultaneously.

Normally, a sudden incident of power outage may affect large scaled and massive wireless nodes at the same time in a practical field. Currently, CG-mesh nodes of the CG-mesh network prolong life for the nodes in order to propagate PON messages by providing each device of each CG-mesh node with a super capacitator. However, since generally there are so many CG-mesh nodes suffering a power outage simultaneously, many of the PON messages may be lost enroute to the network controller.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 graphically illustrates examples of relationships based on Pearson Correlation Coefficient (PCC) analysis.

FIG. 4 illustrates a flow diagram of an example method for a controller, e.g., the FND of the network of FIGS. 1A and 1B, for deducing a state of neighboring devices using the ML model.

DESCRIPTION OF EXAMPLE CONFIGURATIONS

Overview

Figure 1A:
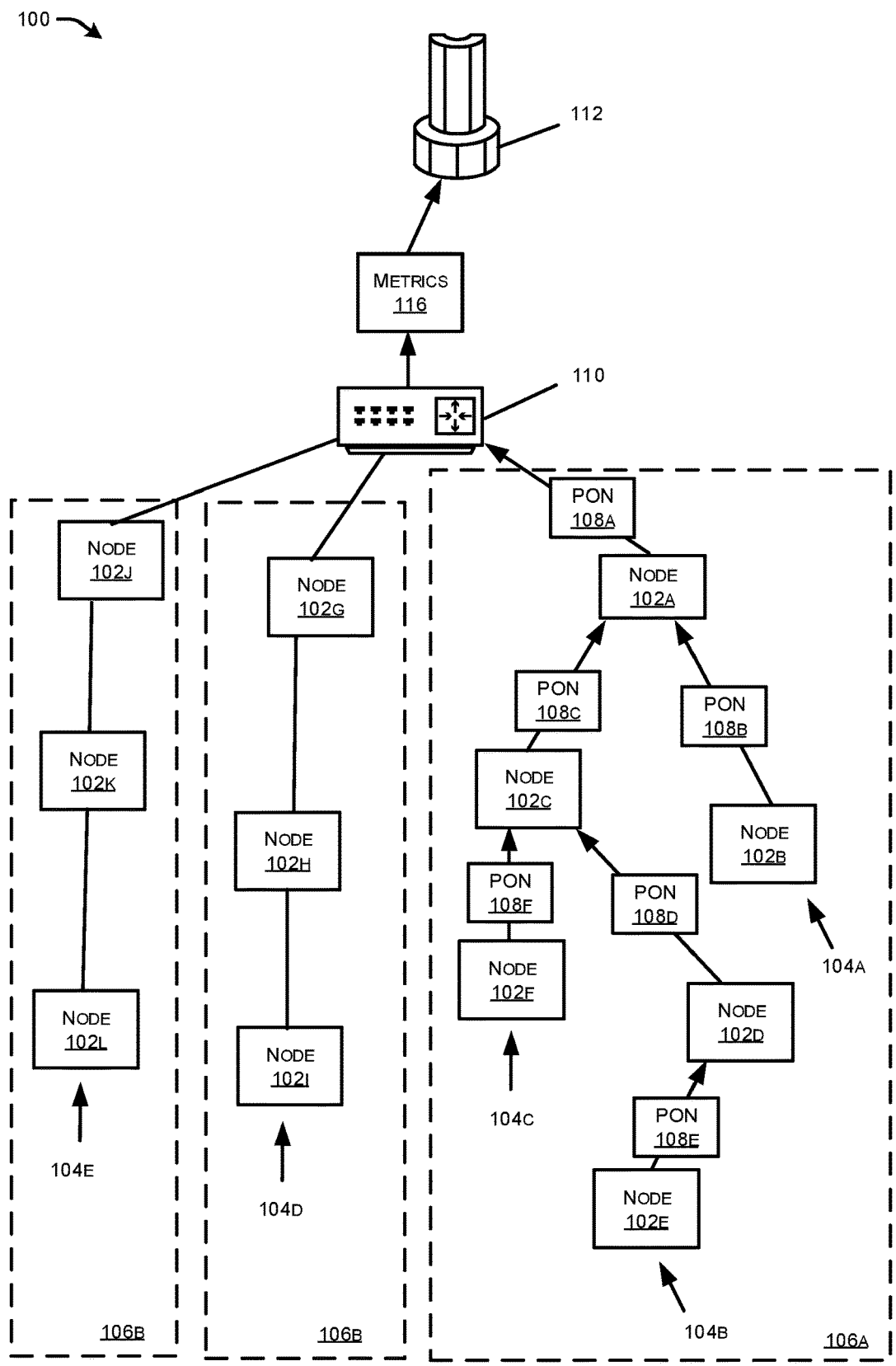
FIGS. 1A and 1B schematically illustrate an example of a portion of a low power and lossy network (LLN) sending power outage notification (PON) messages and power restoration notification (PRN) messages.

This disclosure describes techniques for detecting and deducing of urgent messages in low-power and lossy networks (LLNs) using a correlation analysis of the nodes within a network e.g., (a connected grid mesh (CG-mesh) network) and machine learning (ML) models. Utilizing these techniques, a field network director (FND) of the network, which serves as a controller of the network, can determine, e.g., detect, neighboring devices e.g., nodes, within the network. Based upon the determination of the neighboring devices, ML models may be utilized to determine that based upon receipt of a power outage notification (PON) message and/or a power restoration notification (PRN) message from one or more nodes, neighboring nodes of the one or more nodes may also have suffered a power outage and/or a subsequent power restoration, even if the FND did not receive a corresponding PON message and/or a corresponding PRN message from the neighboring nodes of the network. Thus, loss of power and subsequent power restoration may be handled for large numbers of neighboring nodes within the network, even when only a few PON messages and/or subsequent PRN messages are received.

In particular, a method in accordance with techniques described herein, may include a controller of a network receiving from a router of the network an indication of receipt of one or more first urgent messages at the router from one or more first nodes of a plurality of nodes within the network. The one or more first urgent messages may indicate a first state of the one or more first nodes, e.g., the first state may indicate a power loss at the one or more first nodes. The controller may use a model to determine one or more second nodes, e.g., neighboring nodes, of the plurality of nodes that are likely to also be in the first state, e.g., have also lost power. The controller may receive from the router an indication of receipt of one or more second urgent messages at the router from one or more of the one or more first nodes of the plurality of nodes. The one or more second urgent messages may indicate a second state of the one or more first nodes, e.g., a restoration of power at the one or more first nodes. The controller may then use the model to determine one or more of the one or more second nodes (and possibly some of the one or more first nodes) likely to be in the second state, e.g., one or more of the one or more second nodes likely to have power restoration.

In configurations, the method may include the controller gathering data from the plurality of nodes of the network. The controller may perform a correlation analysis using the data. Based at least in part on the correlation analysis, the controller may select the model for use in determining that one or more second nodes of the plurality of nodes is likely to be in the first state, as well as for the determining that one or more of the one or more second nodes is likely to be in the second state.

Additionally, the techniques described herein may be performed by a system and/or device having non-transitory computer-readable media storing computer-executable instructions that, when executed by one or more processors, performs the method described above.

Example Configurations

Generally, as previously noted, a field network director (FND) of low-power and lossy network (LLN), which in configurations may be configured as a connected grid mesh network (CG-mesh network), is in charge of monitoring receipt of power outage notification (PON) messages and power restoration notification (PRN) messages nodes of the LLN. In configurations, the FND is implemented within a cloud-based arrangement.

The PON messages and PRN messages are generally received from nodes of the LLN by a field area router (FAR). Generally, the nodes are coupled to the FAR in a tree type configuration, e.g., an eight-hop network configuration. More or less hops may be used in the network configuration if desired. In configurations, the FAR may provide indications of receipt of the PON messages and PAR messages to the FND rather than the actual messages themselves, although the FAR may forward the actual received PON messages to the FND. In configurations, other types of networks and network configurations may implement techniques and/or architecture as described herein.

Once the FND receives indication of receipt of PON message(s) or PRN message(s), a predetermined action may be triggered by the FND. However, when a power outage occurs, as well as a corresponding power restoration, either event occurs simultaneously with respect to the nodes of the LLN and thus, a massive amount of PON messages and/or corresponding PRN messages are sent by the nodes. This is a burden on the network and leads to PON messages being lost enroute, as well as a potentially long latency of PRN message receipt.

Although some PON messages are dropped (or unable to be sent due to the loss of power at the nodes) or some PRN messages are delayed enroute, the FND may still deduce the status for failed nodes based on received messages from other nodes within an eight-hop configured network. For example, the FND knows that nodes A, B, and C share the same power line. Thus, if PON messages from nodes A and B are received by the FND, then the FND may easily deduce that node C has also lost power since it is a neighboring node of nodes A and B on the same power line.

Thus, in configurations, the FND collects various metrics from each node and performs a correlation analysis using the metrics to determine correlations among nodes of the network. The metrics may include, for example, location, relationship among nodes, link quality parameters such as, for example, link quality index (LQI) and received signal strength indicator (RSSI), remaining energy of a supercapacitor at the node, modulation type, transmission data rate, density of neighbors, e.g., other nodes, expected transmission count (ETX) rank, PON message/PRN message throughput, etc. After collecting the parameters from the LLN nodes, an appropriate machine learning (ML) method for PON message/PRN message detection and deduction may be selected. The collected metrics generally have a relationship between each other and thus, the in order to find the relationships among the collected metrics, a correlation analysis is performed. In configurations, the correlation analysis comprises a Pearson Correlation Coefficient (PCC) analysis.

Once the correlation analysis has been performed, in configurations, if a correlation analysis determines that there is either a negative or positive correlation, then a Linear Regression (LR) model may be used for detection and deduction of neighboring LLNs with respect to each other and with respect to received PON messages and/or PRN messages. However, if the correlation analysis determines that there is no correlation, then in configurations, a Naïve Bayesian Classifier (NBC) model may be used for detection and deduction of neighboring LLNs with respect to each other and with respect to received PON messages and/or PRN messages that indicate a power loss state and/or a power restoration state, respectively, for neighboring nodes.

Certain implementations and configurations of the disclosure will now be described more fully below with reference to the accompanying figures, in which various aspects are shown. However, the various aspects may be implemented in many different forms and should not be construed as limited to the implementations set forth herein. The disclosure encompasses variations of the configurations, as described herein. Like numbers refer to like elements throughout.

FIG. 1A schematically illustrates an example of a portion of a LLN 100. In configurations, the LLN 100 is configured as CG-mesh network that includes a plurality of CG-mesh nodes 102*a*-102*l* (which may be referred to collectively herein as nodes 102). As can be seen, the nodes 102 are arranged in a tree-type configuration and thus, multiple nodes 102 are coupled to one another along branches 104*a*, 104*b*, 104*c*, 104*d*, and 104*e*, e.g., the nodes 102 have "neighbors." The nodes 102 may be any suitable electronic device that is capable of communicating with other electronic devices via the network 100. For example, and without limitation, the nodes 102 may be any one of a computer, a server, a peripheral device such as, for example, a printer, a facsimile machine, etc., a mobile electronic device such as, for example, a smart phone, a laptop computer, a tablet, a notebook, etc. The nodes 102 may be configured as Internet nodes and may be electronic devices configured as Internet of Things (IoT) devices.

If a first region 106*a* loses power, then the nodes 102 within the region 106*a* will send power outage notification (PON) messages 108 to a field area router (FAR) 110. The nodes 102 within the other two regions 106*b* and 106*c* have not lost power and thus, do not send PON messages to the FAR 110. Each of the regions 106*a*-106*c* generally include many mode nodes 102 and branches 104.

Thus, when the outage event occurs, the affected nodes 102*a*-102*f* will generate their own PON messages 108*a*-108*f*. The nodes 102*a*-102*f* will forward the generated PON messages 108 to the FAR 110. However, as may be seen in FIG. 1A, some nodes 102 forward PON messages 108 on behalf of other nodes 102. For example, node 102*f* needs nodes 102*c* and 102*a* to forward its PON message 108*f* to the FAR 110. However, before a supercapacitor (not illustrated) included within each node 102 exhausts its energy, one or more nodes 102 may have no time to receive and/or forward a neighbor node's PON messages 108, e.g., the PON message 108f of node 102f is lost enroute if either node 102c or node 102a loses backup power from its supercapacitor before forwarding the PON message 108 of node 102c. In configurations, the FAR 110 may provide indications or notifications (not illustrated) of receipt of the PON messages 108 to a field network director (FND) 112 (which may serve as the controller for the network 100) rather than the actual PON messages 108 themselves, although the FAR 110 may forward the actual received PON messages 108 to the FND 112 in configurations. In configurations, the FND 112 is implemented within a cloud-based arrangement and serves as a controller of the LLN 100.

Figure 1B:
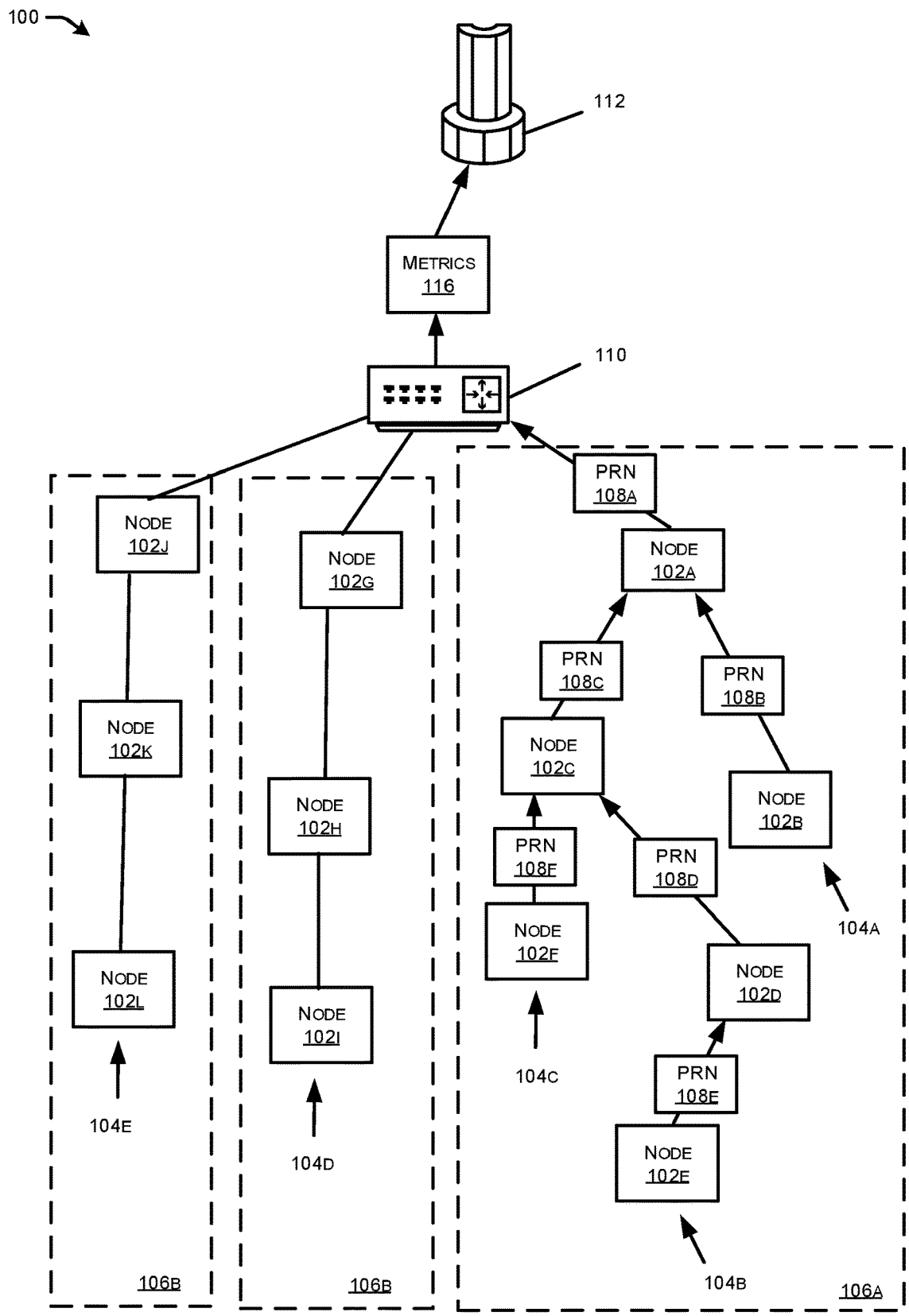

Likewise, in FIG. 1B, when power is restored within the first region 106a, all affected outage nodes 102a-102f will "wake up" and send power restoration notification (PRN) messages 114 simultaneously to the FAR 110. Such concurrent traffic may break down the LLN 100 and thus, create a long latency of receiving the PRN messages 114 for all of the affected nodes 102a-102f in the first region 106a at the FAR 110. In configurations, the FAR 110 may provide indications or notifications (not illustrated) of receipt of the PRN messages 114 to the field FND 112 rather than the actual PRN messages 114 themselves, although the FAR 110 may forward the actual received PRN messages 114 to the FND 112 in configurations.

Once the FND 112 receives indication of receipt of PON message(s) 108 or PRN message(s) 114, a predetermined action may be triggered by the FND 112. However, when a power outage occurs, as well as a corresponding power restoration, either event occurs simultaneously with respect to the nodes 102 of the LLN 100 and thus, a massive amount of PON messages 108 and/or corresponding PRN messages 114 are sent by the nodes 102. This is a burden on the LLN 100 and may lead to PON messages 108 being lost enroute, as well as a potentially long latency of receipt of PRN message 114, as previously noted.

Although some PON messages 108 are dropped (or unable to be generated due to the loss of power at the nodes 102) or some PRN messages 114 are delayed enroute, the FND 112 may still deduce the status of failed nodes 102 based on received PON messages 108 and/or PRN messages 114 from other neighboring nodes 102 within the LLN 100, e.g., along the same branch 104 and/or within the same region 106.

Thus, in configurations, the FND 112 collects various metrics 116 via the FAR 110 from each node 102 and performs a correlation analysis using the metrics 116 to determine correlations among nodes 102 of the LLN 100 for selection of a machine learning (ML) model for use in detecting neighboring nodes 102 and deducing states of neighboring nodes 102 based at least on received PON messages 108 and PRN messages 114 from other nodes 102.

The metrics 116 may include location since power outage/restoration events often happen in the same cluster of nodes. For example, these nodes may be driven by the same power line or the same substation. Another metric may include relationship among nodes. Sometimes, if the FND 112 receives PON message 108 and/or a PRN message 114 from a parent node, the parent node's children will likely have the same transmission. A further metric may include link quality parameters such as link quality index (LQI) and received signal strength indicator (RSSI). If the link quality is bad, PON messages 108 and/or PRN messages 114 may be lost. This metric may have a weak-correlation for some ML models but may be useful when a strong-correlation indicator threshold is triggered. Another metric may include remaining energy of a super capacitor at a node 102. This metric may decide the probability of a PON message 108 being drop for a node 102. Further metrics 116 may include modulation type, e.g., 2FSK or OFDM, and/or a transmission data rate: e.g. 50 kbps, 150 kbps or 250 kbps, etc. Another metric may include a density of neighbor nodes 102. This metric may denote the competitiveness of PON message 108/PRN message 114 propagation in the neighborhood. The more neighbors a node has, the probability of losing PON messages 108 and/or PRN messages 114 are higher. Another metric may include expected transmission count (ETX). The ETX as a single metric in a remote initial program load (RIPL) network, results in excessive use of some paths, especially those with high delivery rates. This excessive use of good-quality paths may result eventually in network partition and reduce the overall lifetime of an internet protocol (IP)v6 over low-power wireless personal area network (6LoWPAN). A further metric may include rank, which describes how far a node 102 is away from the FAR 110. A node 102 that is far away from the FAR 110 may easily lose its PON messages 108 and/or PRN messages 114 enroute. Another metric may include PON message 108 and/or PRN message 114 throughput. When a PON or a PRN event occurs, any affected node 102 will send and forward corresponding traffic toward the FAR 110 via an upstream path. Thus, the ML algorithm may easily to see outlier data from normal data according to traffic size. Other metrics 116 may also be used and the previously discussed example metrics 116 are not meant to be limiting.

After collecting the metrics 116 from the nodes 102, an appropriate machine learning (ML) method for PON message/PRN message detection and deduction may be selected of neighboring nodes 102. The collected metrics 116 generally have a relationship between each other and thus, in order to find the relationships among the collected metrics 116, a correlation analysis is performed. In configurations, the correlation analysis comprises a Pearson Correlation Coefficient (PCC) analysis.

In particular, as is known, Pearson's Correlation Coefficient is the covariance of the two variables divided by the product of their standard deviations. The form of the definition involves a "product moment," that is, the mean (the first moment about the origin) of the product of the mean-adjusted random variables; hence the modifier product-moment in the name.

Pearson's Correlation Coefficient when applied to a population is commonly represented by the Greek letter ρ (rho) and may be referred to as the population correlation coefficient or the population Pearson Correlation Coefficient. Given a pair of random variables (X,Y), the Equation 1 for ρ is:

$$\rho_{x,y} = \frac{\text{cov}(X, Y)}{\sigma_x \sigma_y} = \frac{E[(X - \mu X)(Y - \mu Y)]}{\sigma_x \sigma_y} \quad (1)$$

where:
cov is the covariance;
$\sigma_x$ is the standard deviation of X;
$\sigma_y$ is the standard deviation of Y;
$\mu_x$ is the mean of X;
$\mu_y$ is the mean of Y; and
E is the expectation.

The value of PCC (ρ) is in an interval [−1,1]. If ρ is in the interval [−1,0], it denotes a negative correlation between two types of parameters. If ρ is in the interval [0,1], it denotes a positive correlation between two types of parameters. If ρ is equal to 0, it denotes no correlation in between. FIG. 2 graphically illustrates examples of various relationships for ρ. For example, at 202, the relationship where ρ is equal to −1 is graphically illustrated. At 204, the relationship where ρ is in the interval [−1,0] is graphically illustrated. At 206, the relationship where p is in the interval [0,−1] is graphically illustrated. At 208, the relationship where ρ is equal to +1 is graphically illustrated. At 210, the relationship where ρ is equal to 0 is graphically illustrated.

Once the correlation analysis has been performed, in configurations, if a correlation analysis determines that there is either a negative or positive correlation among nodes 102, then a Linear Regression (LR) machine learning (ML) model may be used for detection and deduction of neighboring nodes 102 with respect to received PON events and/or PRN events. However, if the correlation analysis determines that there is no correlation, then in configurations, a Naïve Bayesian Classifier (NBC) ML model may be used to determine the state of neighboring nodes 102 based on received PON messages 108 and/or PRN messages 114 that indicate a power loss state and/or a power restoration state, respectively, for neighboring nodes 102.

In particular, if, based on the correlation analysis, most of the parameters have a linear relation in pairs, a LR ML model may be good to use, no matter whether the linear relation is a positive or negative relationship. Given the collected data set is $\{y_i, x_{i1}, \ldots, x_{ip}\}$, i in [1, n]. The following Equation 2 may present the linear relationship between the dependent variable and regressors:

$$y_i = \beta_0 + \beta_1 x_{i1} + \ldots + \beta_p x_{ip} + \epsilon_i, \; i=1,2,\ldots,n$$

In Equation 2, y denotes whether a PON or PRN event occurs, while x denotes the input parameters as mentioned above.

However, in the case of no relationship for all pairs (which is generally a very low probability), a NBC ML model may be good to use. The NBC model is a prior probability distribution (often simply called the prior) of an uncertain quantity, which is the probability distribution that would express one's beliefs about a quantity before some evidence is taken into account. It is known that the probability of a desired event does depend on the probabilities of the desired event's relationship with other factors. The following Equation 3 describes the Bayes' theorem:

$$P(c \mid x) = \frac{P(c)P(x \mid c)}{P(x)} = \frac{P(x, c)}{P(x)} \quad (3)$$

In Equation 3, c represents a situation for random events, e.g., whether a PON or a PRN event occurs or not. Moreover, x represents evidence or a condition that indicates all factors regarding random events, e.g., the probability of a node 102d having a PON event when nodes 102a, 102b, and 102c have PON events. The definitions for Equation 3 are:

P(c|x): the probability of c with x condition. (posterior probability);

P(c): the probability of c without considering conditions. (prior probability);

P(x|c): the probability of x carries c situation. (posterior probability); and

P(x): the probability of x. (prior probability).

Figure 3:
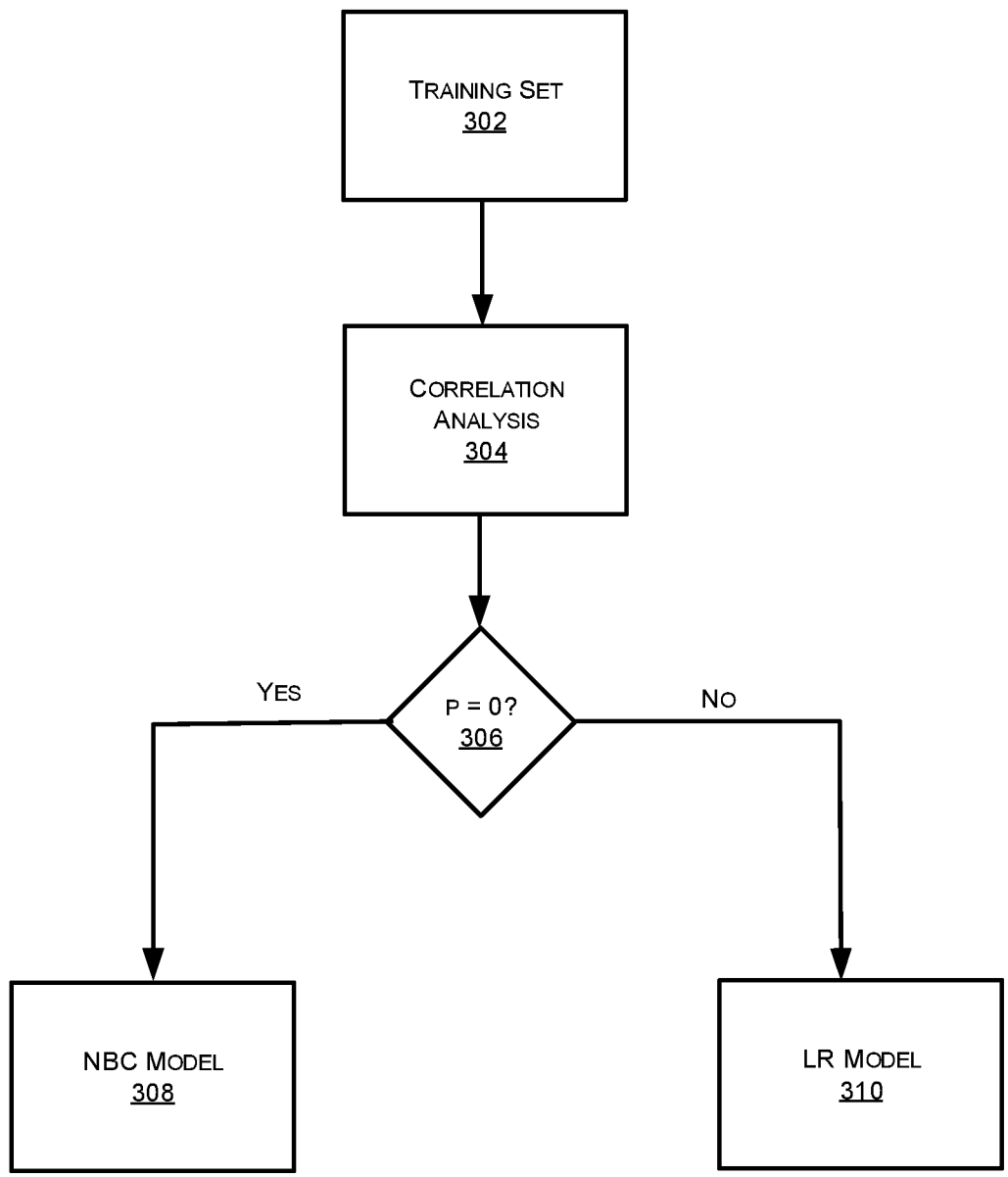
FIG. 3 illustrates a flow diagram for selecting a machine learning (ML) model for use by the field network director (FND) of the network of FIGS. 1A and 1B to determine neighboring nodes having a power outage state and/or a power restored state.

Thus, referring to FIG. 3, the FND 112 collects as many metrics 116 (data) as possible from the nodes 102, including when a PON event and a PRN event occurs, and stores the metrics 116 in a database as a training set at 302. Using the training set, the FND 112 performs a correlation analysis at 304 and decides whether ρ is equal to 0 at 306, and thus choose the NBC model at 308. If ρ is not equal to 0 at 306, and thus choose the LR model at 310, according to the result of correlation analysis, e.g., the PCC analysis. No matter whether the selection algorithm is NBC or LR, the FND 112 trains (using the collected metrics 116) and saves the selected model for future use in deducing states, e.g., PON and/or PRN, of nodes 102 based on received PON messages 108 and/or PRN messages 114 that indicate a power loss state and/or a power restoration state, respectively, for neighboring nodes 102, e.g., detection. Thus, the selected ML model may be used to detect, e.g., define, neighboring nodes 102 within branches 104 and/or regions 106. The selected ML model may be used to determine, e.g., deduce, states of neighboring nodes 102 within branches 104 and/or regions 106 based on, for example, received PON messages 108 and/or PRN messages 114 from some nodes 102 that indicate a power loss state and/or a power restoration state, respectively, for neighboring nodes 102, e.g., a detection of a PON event or a PRN event.

In configurations, the FND 112 may continue to gather metrics 116 to continue to train the selected model. Additionally, the FND 112 may periodically use the collected metrics 116 to perform a correlation analysis to see if the correlation among the neighboring nodes 102 has changed and thus, that a change should be made between the use of the LR model or the NBC model. The collected metrics 116 may be gathered, for example, hourly, every six hours, every 12 hours, daily, etc. Additionally, additional correlation analysis may take place weekly, every two weeks, monthly, etc.

FIG. 4 illustrates a flow diagram of an example method 400 that illustrates aspects of the functions performed at least partly by the FND 112 as described in FIGS. 1-3. The logical operations described herein with respect to FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in the FIG. 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for a controller, e.g., FND 112, of a network, e.g., network 100, for deducing a state of neighboring devices, e.g., nodes 102. In examples, the controller may comprise one or more processors, and one or more non-transitory computer-readable media storing computer-executable instructions that, when executed by the one or more processors, cause the one or more processors to perform steps of method 400.

At 402, an indication is received by the controller from a router of the network, e.g., router 110. The indication indicates receipt of one or more first urgent messages at the router from one or more first nodes of the plurality of nodes, e.g., nodes 102. The one or more first urgent messages indicate a first state of the one or more first nodes. At 404, the controller uses a model to determine one or more second nodes of the plurality of nodes likely to be in the first state.

At 406, an indication is received by the controller from the router. The indication indicates receipt of one or more second urgent messages at the router from one or more of the one or more first nodes of the plurality of nodes. The one or more second urgent messages indicate a second state of the one or more of the one or more first nodes. At 408, the controller uses the model to determine one or more of the one or more second nodes of the plurality of nodes likely to be in the second state. The controller may also use the model to determine that others of the one or more first nodes of the plurality of nodes are also likely to be in the second state.

Thus, once the FND 112 has received an indication of a PON message 108 or a PRN message 114 from the FAR 110 relating to a particular node 102 or nodes 102, the FND 112 may use the trained model in order to deduce that other neighboring nodes 102 share the same state, e.g., a power outage state or a power restoration state, as the nodes 102 from which PON messages 108 and/or PRN messages 112 have been received. For example, with reference to FIGS. 1A and 1B, if PON messages 108a, 108b, and 108c are received by the FAR 110 from nodes 102a, 102b, and 102c, and such indication is provided to the FND 112, then even though PON messages 108d, 108e, and 108f have not been received from the other nodes 108d, 108e, 108f, the FND 112 may deduce, based on the ML model, that the nodes 102d, 102e, and 102f are also in a power outage state. Likewise, when a PRN message 114a, 114b, and 114c are received from one or more of the nodes 102a, 102b, and/or 102c, then based on the ML model, the FND 112 may deduce that other nodes 102 in region 106a have also had their power restored and are in a power restored state.

Since the FND 112 may be implemented in the cloud, there generally exists a very low probability for the FND 112 to make a wrong a decision such that the FND 112 thinks that, for example, node 102g is in a power outage state when the FND 112 receives a PON message 108a from node 102a since the FND 112 is familiar with the topology of the LLN 100, e.g., the tree configuration or eight-hop configuration of the LLN network 100. Thus, the FND 112 will not introduce a harmful action due to a misdiagnosed power outage deduction. Likewise, no more collections of PRN messages 114 need to be undertaken during PRN, e.g., power restoration, situations since upon receipt of some PRN messages 114, the FND 112 may use the ML mode to deduce other nodes 102 that have had power restored.

While the example configurations have been described herein with respect to PON messages 108 and PRN messages 114 not reaching not reaching the FAR 110 due to power outages at nodes, the techniques and architecture described herein may also be useful with respect to a 6Lo WPAN IOT Security perspective. In particular, if the PON messages 108 and PRN messages 114 from one or more nodes 102 do not reach the FAR 110 on time, then based on trained model, which may be running in the cloud, the FND 112 may also detect the rank and position of the 6Lo WPAN nodes, e.g., nodes 102, where Man-in-the-middle (MITM) attacks may be occurring that prevent the PON messages 108 and PRN messages 114 the one or more nodes from reaching the FAR 110 on time in the uplink direction.

Figure 5:
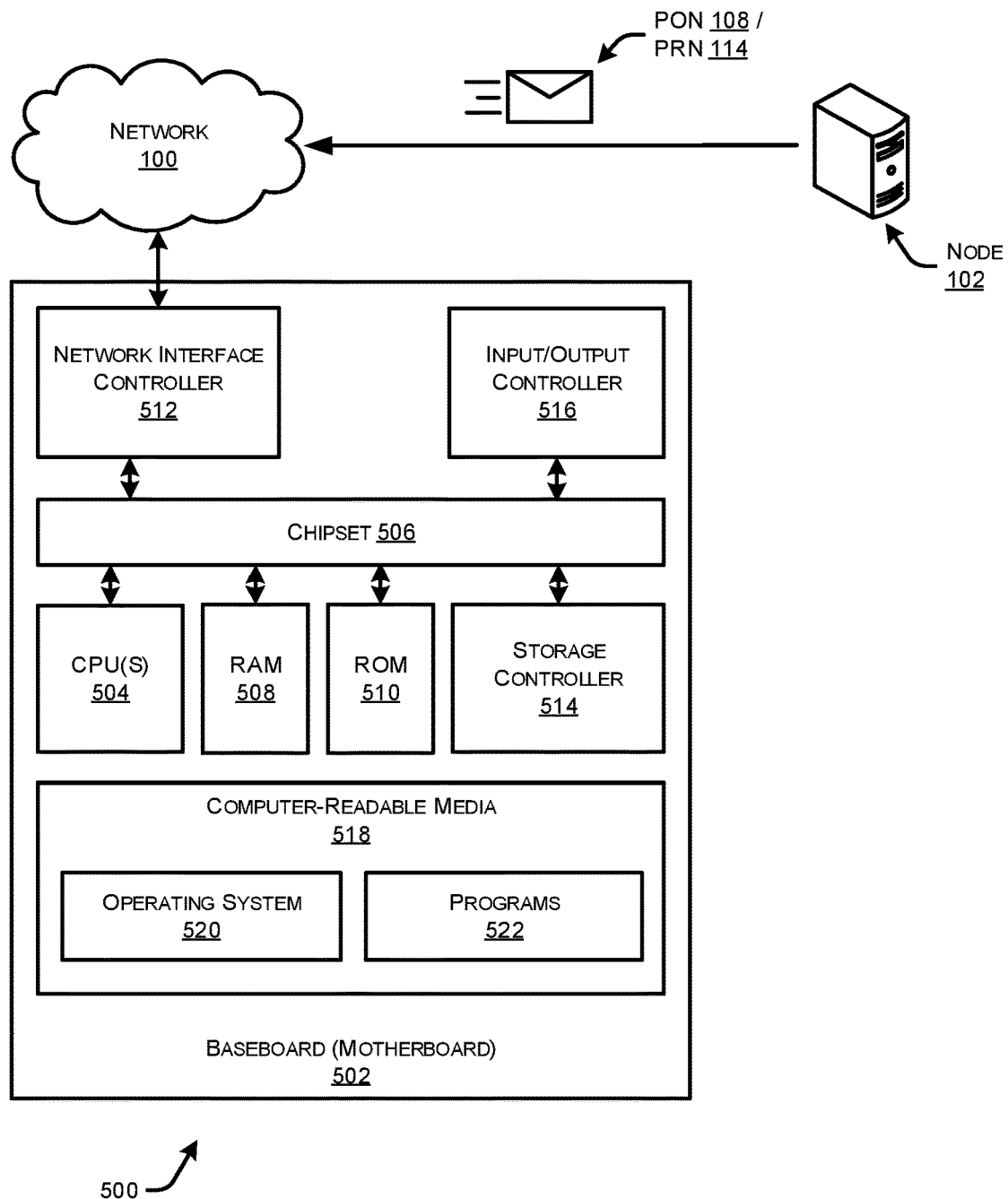
FIG. 5 is a computer architecture diagram showing an illustrative computer hardware architecture for implementing a routing device that can be utilized to implement aspects of the various technologies presented herein.

FIG. 5 shows an example computer architecture for a computer 500 capable of executing program components for implementing the functionality described above. The computer architecture shown in FIG. 5 may correspond to FND 112 as described herein. FIG. 5 also illustrates a node 102 of the network 100 described herein, and may comprise a conventional server computer, workstation, desktop computer, laptop, tablet, network appliance, e-reader, smartphone, or other computing device, and can be utilized to execute any of the software components presented herein. In some examples, however, the computer 500 may correspond to networked devices such as servers, switches, routers, hubs, bridges, gateways, modems, repeaters, access points, etc., and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 100. The chipset 506 can include functionality for providing network connectivity through a NIC 512, such as a gigabit Ethernet adapter. The NIC 512 is capable of connecting the computer 500 to other computing devices over the network 100. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different configurations of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the network 100, and or any components included therein, may be supported by one or more devices similar to computer 500. Stated otherwise, some or all of the operations performed by the network 100, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one configuration, the operating system comprises the LINUX operating system. According to another configuration, the operating system comprises the WINDOWS® SERVER operating system from MICROSOFT Corporation of Redmond, Wash. According to further configurations, the operating system can comprise the UNIX operating system or one of its variants. It should be appreciated that other operating systems can also be utilized. The storage device 518 can store other system or application programs and data utilized by the computer 500.

In one configuration, the storage device 518 or other computer-readable storage media is encoded with computer-executable instructions which, when loaded into the computer 500, transform the computer from a general-purpose computing system into a special-purpose computer capable of implementing the configurations described herein. These computer-executable instructions transform the computer 500 by specifying how the CPUs 504 transition between states, as described above. According to one configuration, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, IP protocols, and any other communication protocol.

The programs 522 may comprise any type of programs or processes to perform the techniques described in this disclosure for performing correlation analysis and choosing models, as well as using the chosen models, as described herein. Additionally, the programs 522 may comprise instructions that cause the computer 500 to perform the techniques for performing correlation analysis and choosing models, as well as using the chosen models, as described herein. Generally, the programs 522 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes configurations having specific structural features and/or methodological acts, it is to be understood that the claims are not necessarily limited to the specific features or acts described. Rather, the specific features and acts are merely illustrative some configurations that fall within the scope of the claims of the application.

What is claimed is:

1. A method performed within a network comprising a plurality of nodes comprising:
   receiving, by a controller of the network and from a router of the network, an indication that the router received one or more first urgent messages from one or more first nodes of the plurality of nodes, the one or more first urgent messages indicating a first state of the one or more first nodes;
   determining, by the controller and at least partly using a model, one or more second nodes of the plurality of nodes that are likely to be in the first state;
   receiving, by the controller and from the router, an indication that the router received one or more second urgent messages from at least one of the one or more first nodes, the one or more second urgent messages indicating a second state of the at least one of the one or more first nodes; and
   determining, by the controller and at least partly using the model, one or more of the one or more second nodes likely to be in the second state.

2. The method of claim 1, wherein:
   the first state comprises power loss at the first nodes and the second nodes; and
   the second state comprises power restoration at the first nodes and the second nodes.

3. The method of claim 1, wherein the controller is configured within a cloud-based arrangement.

4. The method of claim 1, further comprising:
   gathering, by the controller, data from the plurality of nodes;
   performing, by the controller using the data, a correlation analysis; and
   based at least in part on the correlation analysis, selecting, by the controller, the model.

5. The method of claim 4, wherein the model comprises one of Linear Regression or Naïve Bayesian Classifier.

6. The method of claim 4, wherein the correlation analysis comprises Pearson Correlation Coefficient analysis.

7. The method of claim 4, further comprising:
   gathering, by the controller, further data from the plurality of nodes;
   after a predetermined amount of time, performing, by the controller using at least the further data, another correlation analysis; and
   based at least in part on the another correlation analysis, determining, by the controller, to change the model.

8. The method of claim 7, wherein the predetermined amount of time is in a range of two weeks to one month.

9. One or more non-transitory computer-readable media storing computer-executable instructions that, when executed by one or more processors, cause the one or more processors to perform actions comprising:
   receiving, from a router of a network, an indication that the router received one or more first urgent messages from one or more first nodes of a plurality of nodes, the one or more first urgent messages indicating a first state of the one or more first nodes;
   determining, at least partly using a model, one or more second nodes of the plurality of nodes that are likely to be in the first state;
   receiving, from the router, an indication that the router received one or more second urgent messages from at least one of the one or more first nodes, the one or more second urgent messages indicating a second state of the at least one of the one or more first nodes; and
   determining, at least partly using the model, one or more of the one or more second nodes likely to be in the second state.

10. The one or more non-transitory computer-readable media of claim 9, wherein:
    the first state comprises power loss at the first nodes and the second nodes; and
    the second state comprises power restoration at the first nodes and the second nodes.

11. The one or more non-transitory computer-readable media of claim 9, wherein the one or more non-transitory computer-readable media are included within a controller configured within a cloud-based arrangement.

12. The one or more non-transitory computer-readable media of claim 9, wherein the actions further comprise:
    gathering data from the plurality of nodes;
    performing, using the data, a correlation analysis; and
    based at least in part on the correlation analysis, selecting the model.

13. The one or more non-transitory computer-readable media of claim 12, wherein the model comprises one of Linear Regression or Naïve Bayesian Classifier.

14. The one or more non-transitory computer-readable media of claim 12, wherein the correlation analysis comprises Pearson Correlation Coefficient analysis.

15. The one or more non-transitory computer-readable media of claim 12, wherein the actions further comprise:
    gathering further data from the plurality of nodes;
    after a predetermined amount of time, performing another correlation analysis; and
    based at least in part on the another correlation analysis, determining to change the model.

16. The one or more non-transitory computer-readable media of claim 15, wherein the predetermined amount of time is in a range of two weeks to one month.

17. A computer-implemented method within a network comprising a plurality of nodes comprising:
    receiving an indication of receipt of one or more first urgent messages from one or more first nodes of the plurality of nodes, the one or more first urgent messages indicating a first state of the one or more first nodes;
    determining one or more second nodes of the plurality of nodes likely to be in the first state;
    receiving an indication of receipt of one or more second urgent messages from one or more of the one or more first nodes of the plurality of nodes, the one or more second urgent messages indicating a second state of the of the one or more of the one or more first nodes; and
    determining one or more of the one or more second nodes likely to be in the second state.

18. The computer-implemented method of claim 17, wherein:

the first state comprises power loss at the first nodes and the second nodes; and the second state comprises power restoration at the first nodes and the second nodes.

19. The computer-implemented method of claim 17, further comprising:

gathering data from the plurality of nodes;

performing a correlation analysis; and based at least in part on the correlation analysis, selecting a model for use in (i) the determining one or more second nodes of the plurality of nodes likely to be in the first state and (ii) the determining one or more of the one or more second nodes likely to have the second state.

20. The computer-implemented method of claim 19, further comprising:

gathering further data from the plurality of nodes;

after a predetermined amount of time, performing, using at least the further data, another correlation analysis; and based at least in part on the another correlation analysis, determining to change the model.

* * * * *